Patented June 23, 1925.

1,543,544

UNITED STATES PATENT OFFICE.

LUDWIG BENDA, OF MAINKUR, NEAR FRANKFORT-ON-THE-MAIN, GERMANY, ASSIGNOR TO LEOPOLD CASSELLA & CO. GESELLSCHAFT MIT BESCHRÄNKTER HAFTUNG, A CORPORATION OF GERMANY.

BENZOXAZOLON-5-ARSONIC ACID.

No Drawing.     Application filed April 17, 1924.    Serial No. 707,304.

*To all whom it may concern:*

Be it known that I, LUDWIG BENDA, a citizen of the Swiss Confederation, residing at Mainkur, near Frankfort-on-the-Main, Germany, have invented a Benzoxazolon-5-Arsonic Acid, of which the following is a full description.

It has been found, that by the action of Phosgen on 4-amino-3-hydroxyphenyl-1-arsonic acid (Benda, B. B. 44,3578/1911) and its analogues and homologues, benzoxazolon-5-arsonic acid is formed, possessing remarkably strong curative powers in diseases caused by spirochætæ but also affording a surprising prophylactic protection. Also on trypanosomes, the new compound, which owing to its relative non-toxicity may be administered in proportionately large doses, both parenterally and ad os, exercises an excellent effect. Its formula is—

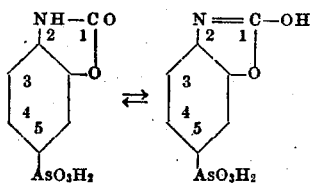

*Example.*—500 g 4-amino-3-hydroxyphenylarsonic acid are dissolved at 70-80° in a solution of sodium acetate double-normal.

After cooling down, phosgen is introduced into the solution at ordinary temperature until the latter shows a strong mineral acid reaction. The new arsenic compound, which in the main precipitates in the form of a crystalline paste, the mother liquor is sucked off and the crystalline mass is then washed, first with cold water, and then with alcohol and ether. By recrystallizing from hot water with the addition of some animal charcoal, white crystals are obtained.

I claim:

As new product benzoxazolon-5-arsonic acid of the probable formula

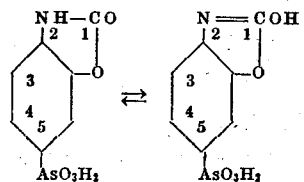

which is a colorless crystalline substance, sparingly soluble in cold, and easily soluble in hot water, very difficultly soluble in alcohol, unsoluble in ether, easily soluble in alkalies at a low temperature.

In witness whereof I have hereunto signed my name this 4th day of April 1924.

LUDWIG BENDA.

Witnesses:
  GABRIELE FLESCH,
  JANE GLUCH.